US009092531B2

(12) United States Patent
Liu et al.

(10) Patent No.: US 9,092,531 B2
(45) Date of Patent: Jul. 28, 2015

(54) CUSTOMIZED CONTENT CONSUMPTION INTERFACE

(71) Applicant: Google Inc., Mountain View, CA (US)

(72) Inventors: Sean Liu, El Dorado Hills, CA (US); Doug Sherrets, San Francisco, CA (US); Marco Paglia, San Francisco, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/776,281

(22) Filed: Feb. 25, 2013

(65) Prior Publication Data

US 2014/0244659 A1 Aug. 28, 2014

(51) Int. Cl.
G06F 17/30 (2006.01)

(52) U.S. Cl.
CPC .... G06F 17/30867 (2013.01); G06F 17/30029 (2013.01)

(58) Field of Classification Search
USPC .......................................... 707/708, 748, 729
See application file for complete search history.

(56) References Cited

U.S. PATENT DOCUMENTS

| | | | |
|---|---|---|---|
| 8,311,382 B1* | 11/2012 | Harwell et al. ................ 386/200 |
| 2008/0134053 A1 | 6/2008 | Fischer |
| 2008/0235589 A1 | 9/2008 | Shaw et al. |
| 2008/0257134 A1 | 10/2008 | Oppenheimer |
| 2008/0319827 A1* | 12/2008 | Yee et al. .......................... 705/10 |
| 2009/0048904 A1* | 2/2009 | Newton et al. ................... 705/10 |
| 2009/0119455 A1 | 5/2009 | Kisel et al. |
| 2009/0150214 A1* | 6/2009 | Mohan ............................. 705/10 |
| 2009/0306962 A1* | 12/2009 | Harlow et al. ..................... 704/9 |
| 2010/0023506 A1* | 1/2010 | Sahni et al. ......................... 707/5 |
| 2010/0205541 A1* | 8/2010 | Rapaport et al. ............... 715/753 |
| 2010/0269158 A1* | 10/2010 | Ehler et al. .......................... 726/4 |
| 2010/0287033 A1 | 11/2010 | Mathur |
| 2012/0101965 A1* | 4/2012 | Hennig et al. ................... 706/12 |
| 2012/0102410 A1 | 4/2012 | Gewecke et al. |
| 2012/0191644 A1* | 7/2012 | Carter et al. .................... 707/608 |
| 2013/0054558 A1* | 2/2013 | Raza et al. ..................... 707/709 |
| 2013/0080524 A1* | 3/2013 | Rubinstein et al. ............ 709/204 |
| 2013/0081056 A1* | 3/2013 | Hu et al. ......................... 719/313 |
| 2013/0103814 A1* | 4/2013 | Carrasco et al. ............... 709/223 |
| 2013/0232148 A1* | 9/2013 | MacDonald et al. .......... 707/740 |
| 2014/0181667 A1* | 6/2014 | Chen et al. ..................... 715/716 |

OTHER PUBLICATIONS

EPO, "International Search Report", PCT/US2014/017996, Jun. 25, 2014.

* cited by examiner

*Primary Examiner* — Cam-Linh Nguyen
(74) *Attorney, Agent, or Firm* — Morris & Kamlay LLP

(57) ABSTRACT

A content processing device may be operable to analyze activity information associated with particular content identified in a content library associated with a user account. One or more entities associated with the particular content may be identified by the content processing device. The content processing device may collect, from various sources, information related to each of the identified one or more entities. The content processing device may determine, based on one or both of a result of the analysis and the collected information, update information for the particular content. The content processing device may then add, based on one or more ranking factors, item information comprising the particular content along with the determined update information to a list of items associated with the user account. Upon receiving an indication from a data processing device, the content processing device may communicate the list of items to the data processing device.

20 Claims, 4 Drawing Sheets

CUSTOMIZED CONTENT CONSUMPTION INTERFACE

FIELD

Certain embodiments of the disclosure relate to online libraries. More specifically, certain embodiments of the disclosure relate to a method and system for customized content consumption interface.

BACKGROUND

Content, such as music, movies, books and/or magazines, may be stored and available in an online library associated with a user account. The online library may be accessible from a data processing device such as, for example, a smart phone, a mobile phone, a tablet, a PC and/or other similar type of computing device. In some instances, a user may not actually consume such as, for example, view, listen to or read a portion of certain content which is stored in the online library associated with the user's account.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for customized content consumption interface. In various embodiments of the disclosure, a content processing device may comprise a plurality of content libraries each associated with a different user account. The content processing device may analyze activity information associated with particular content identified in a content library which is associated with a user account. One or more entities associated with the particular content may be identified by the content processing device. The content processing device may collect, from various sources, information related to each of the identified one or more entities. Based on one or both of a result of the analysis of the activity information and the collected information related to each of the identified one or more entities, the content processing device may determine update information for the particular content. The content processing device may then add, based on one or more ranking factors, item information comprising the particular content along with the determined update information to a list of items associated with the user account.

Various advantages, aspects and novel features of the present disclosure, as well as details of an illustrated embodiment thereof, will be more fully understood from the following description and drawings.

DETAILED DESCRIPTION

Figure 1:
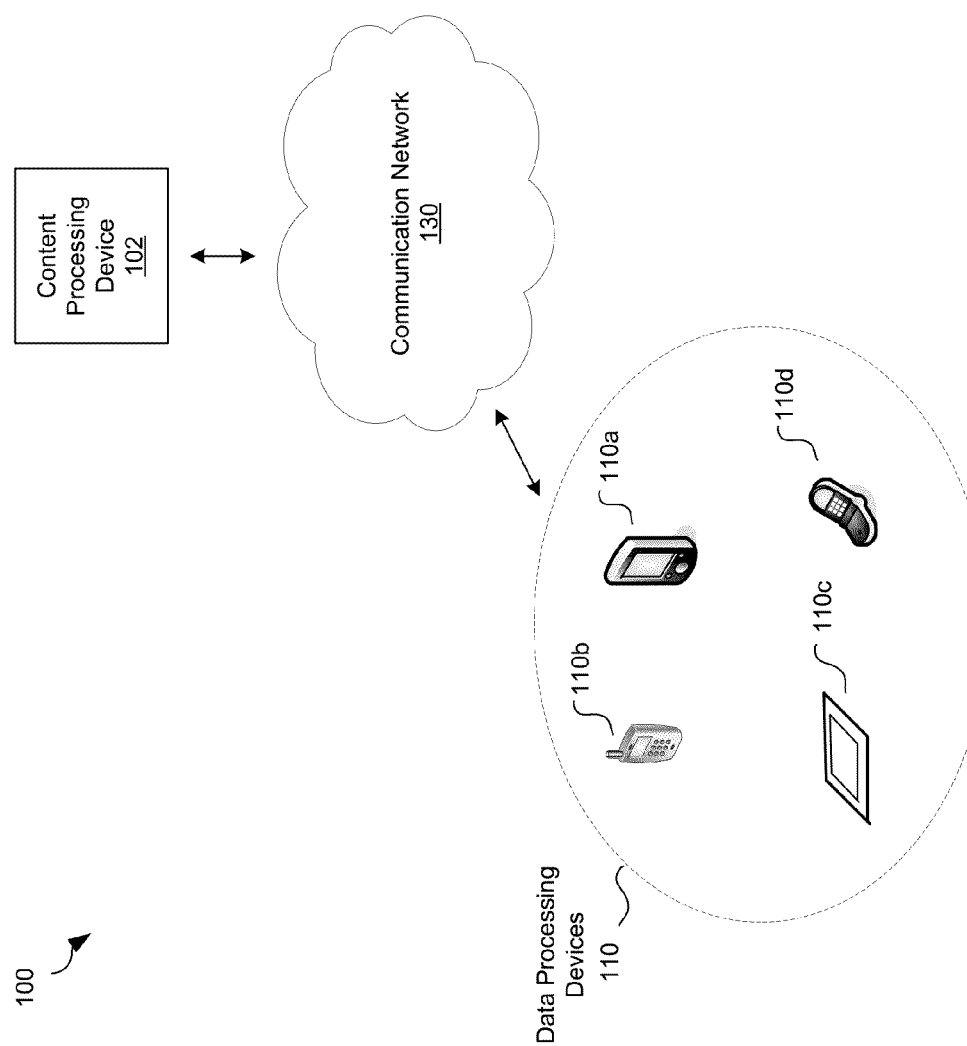
FIG. 1 is a block diagram illustrating an example communication system, in accordance with an embodiment of the disclosure.

Certain embodiments of the disclosure can be found in a method and system for customized content consumption interface. Certain specific details are set forth in the following description and in drawings to provide a thorough understanding of various embodiments of the disclosure. Additional embodiments of the present disclosure may be practiced without several of the details described in the following description.

In various embodiments of the disclosure, a content processing device may be operable to analyze activity information associated with particular content identified in a content library which is associated with a user account. One or more entities associated with the particular content may be identified by the content processing device. The content processing device may be operable to collect, from various sources, information related to each of the identified one or more entities. The content processing device may be operable to determine, based on one or both of a result of the analysis of the activity information and the collected information related to each of the identified one or more entities, update information for the particular content. The content processing device may then be operable to add, based on one or more ranking factors, item information comprising the particular content along with the determined update information to a list of items associated with the user account. An indication for accessing the content library associated with the user account may be received, by the content processing device, from a data processing device. The content processing device may then be operable to communicate, based on the indication, the list of items to the data processing device. In this regard, the activity information may comprise, for example, action taken by a user of the user account and/or by someone who is socially networked to the user. The particular content may comprise, for example, text content, video content and/or audio content. The one or more ranking factors may comprise, for example, time of occurrence, entity identification, entity frequency, entity match, interest level, clustered interests and/or library activity.

In an example embodiment of the disclosure, the update information may comprise, for example, information on one or more particular pages in the text content, where the one or more particular pages may mention the one or more entities. The update information may comprise, for example, information on one or more popular video clips and corresponding commentaries, where the one or more popular video clips may be related to the one or more entities associated with the video content. The update information may comprise, for example, information on ranking charts, related news, playback and/or purchasing associated with the audio content. In some instances, the update information may also comprise, for example, information on one or more posts with text related to the one or more entities associated with the particular content. In other instances, the update information may also comprise, for example, information on a total number of reviews, a percentage of people who have consumed full content and/or sales charts associated with the particular content.

FIG. 1 is a block diagram illustrating an example communication system, in accordance with an embodiment of the disclosure. Referring to FIG. 1, there is shown a communication system 100. The communication system may comprise a content processing device 102, a communication network 130 and a plurality of data processing devices 110, of which data processing devices 110a-110d are illustrated.

The content processing device 102 may comprise suitable logic, circuitry, interfaces and/or code that may be operable to store content such as, for example, audio content, video content, book content and/or applications associated with a plurality of user accounts. For example, the content processing device 102 may be a content library server or a content library device. The content may be accessible from, for example, one or more of the plurality of data processing devices 110a-110d. In an example embodiment of the disclosure, the content processing device 102 may be operable to provide a list of items which may be customized and updated for each user account. The list of items may comprise, for example, content information along with update information associated with the content.

A data processing device such as the data processing device 110a may comprise suitable logic, circuitry, interfaces and/or code that may be operable to process data or signals. The data processing device 110a may be operable to communicate signals across the communication network 130. The data processing device 110a may comprise, for example, a smart phone, a mobile phone, a tablet, a PC and/or other similar type of computing device. In an example embodiment of the disclosure, the data processing device 110a, which may be associated with a particular user account of the content processing device 102, may be operable to receive, from the content processing device 102, a customized list of items comprising content information along with corresponding update information.

The communication network 130 may comprise suitable logic, circuitry, interfaces, devices and/or code that may be operable to provide data and voice communication services to various devices by using various wireless and/or wired communication technologies. The communication network 130 may comprise, for example, the Internet, a cellular network and/or other multimedia network. In an example embodiment of the disclosure, the communication network 130 may be operable to provide communications among the content processing device 102 and the plurality of data processing devices 110a-110d.

In operation, the content processing device 102 may be operable to analyze activity information associated with particular content identified in a content library which is associated with a user account. One or more entities associated with the particular content may be identified by the content processing device 102. In this regard, the particular content may comprise, for example, text content, video content and/or audio content. For example, the particular content may be a book, a movie, or a music album. An entity may comprise, for example, a thing, a person, a place, a subject, or an object, which may be covered/contained/mentioned in the particular content. For example, a documentary movie with a title "Processing Orange Juice" may comprise entities such as "orange", "orange juice", "orange crop" or "orange grove" in the movie content. The activity information may comprise, for example, action taken by a user of the user account and/or by someone who is socially networked or connected to the user. For example, the user may be socially networked or connected to a friend via, for example, a social network. The activity information associated with the documentary movie entitled "Processing Orange Juice" may comprise, for example, the user's interaction with the content library to watch parts (or no part) of the documentary movie, the friend's interaction with the friend's content library to watch parts (or no part) of the documentary movie, the user's or the friend's search for "orange juice" related articles recently, the user's or the friend's watching of video clips related to "orange juice", the user's or the friend's downloading/viewing/reading of content samples related to "orange juice", and/or the user's or the friend's sharing of a link/post about "orange juice".

The content processing device 102 may be operable to collect, from various sources, information related to each of the identified one or more entities. For example, for the case of the documentary movie entitled "Processing Orange Juice", the related information may comprise, for example, news with a major story about "orange juice crops" this year in certain part of the country. The content processing device 102 may be operable to determine, based on one or both of a result of the analysis of the activity information and the collected information related to each of the identified one or more entities, update information for the particular content. For example, for the case of the documentary movie entitled "Processing Orange Juice", the user may have not viewed the movie content stored in the content library yet the friend may have shared a post with text "Definitely watch this movie", the determined update information may comprise, for example, the post with the text "Definitely watch this movie" posted by the friend and/or the news with the major story about "orange juice crops" this year in certain part of the country.

The content processing device 102 may then be operable to add, based on one or more ranking factors, item information comprising the particular content along with the determined update information to a list of items associated with the user account. In this regard, the one or more ranking factors may comprise, for example, time of occurrence, entity identification, entity frequency, entity match, interest level, clustered interests and/or library activity. With regard to the time of occurrence, for example, news such as the "orange juice crops" news which happened an hour ago would be considered very recent. With regard to the entity identification, various technologies for identifying entities shown in a given place may be utilized. For example, the entities may be able to be identified on a page of a website. For audio content, the entity identification may be done by making a transcript, and then running an analysis to identify the entities. With regard to the entity frequency, the number of times a given entity appears in the content may be analyzed. With regard to the entity match, an entity identified in a given place such as news may be attempted to be matched with an entity identified in the particular content in the content library. For example, the entity "orange juice" identified in the documentary movie entitled "Processing Orange Juice" may be matched with the entity "orange juice" in the "orange juice crops" news.

With regard to the interest level, interests may be explicitly or implicitly identified via the user based on activity such as content consumed and actions taken in or outside the content library. For example, the user may post content about the entity "orange juice", may search for the entity "orange" in the past and consume (e.g., read/purchase/interact with) an article about "orange juice". Recent interests based on recent activity may tend to be weighted higher. For example, news that isn't recent but is considered very interesting based on user activity or interaction may still be chosen to show. Long-term interests may comprise interests that the user consistently has over time. For example, the user may search for "orange" related objects every day for the past 2 years. With regard to the clustered interests, interests that are related to each other may make sense to consider them together. For example, "oranges" may be related to an entity (e.g., a company) which provides orange juice and "oranges" may also be related to an entity (e.g., a place) where oranges are grown.

With regard to the library activity, for example, the user may recently click to access (e.g., to play) the particular content such as the documentary movie entitled "Processing Orange Juice", the user may have shared content (e.g., a link or a post) to someone else or to public, the user may have watched a given percentage of the full content (such as 3% of a play time of the documentary movie entitled "Processing Orange Juice") a month ago, the user may have watched the particular content a number of times such as watching 3% but watching that part 100 times due to an awesome view of an "orange grove", and/or the user may have watched related videos such as a video clip of "orange farmer" describing a process for harvesting.

The content processing device 102 may be operable to receive an indication for accessing the content library associated with the user account from a data processing device such as the data processing device 110a. The indication may be received by the content processing device 102 via the communication network 130. The content processing device 102 may then be operable to communicate, based on the indication, the list of items to the data processing device 110a as content consumption interface for the user account. The list of items may be communicated to the data processing device 110a via the communication network 130.

Figure 2:
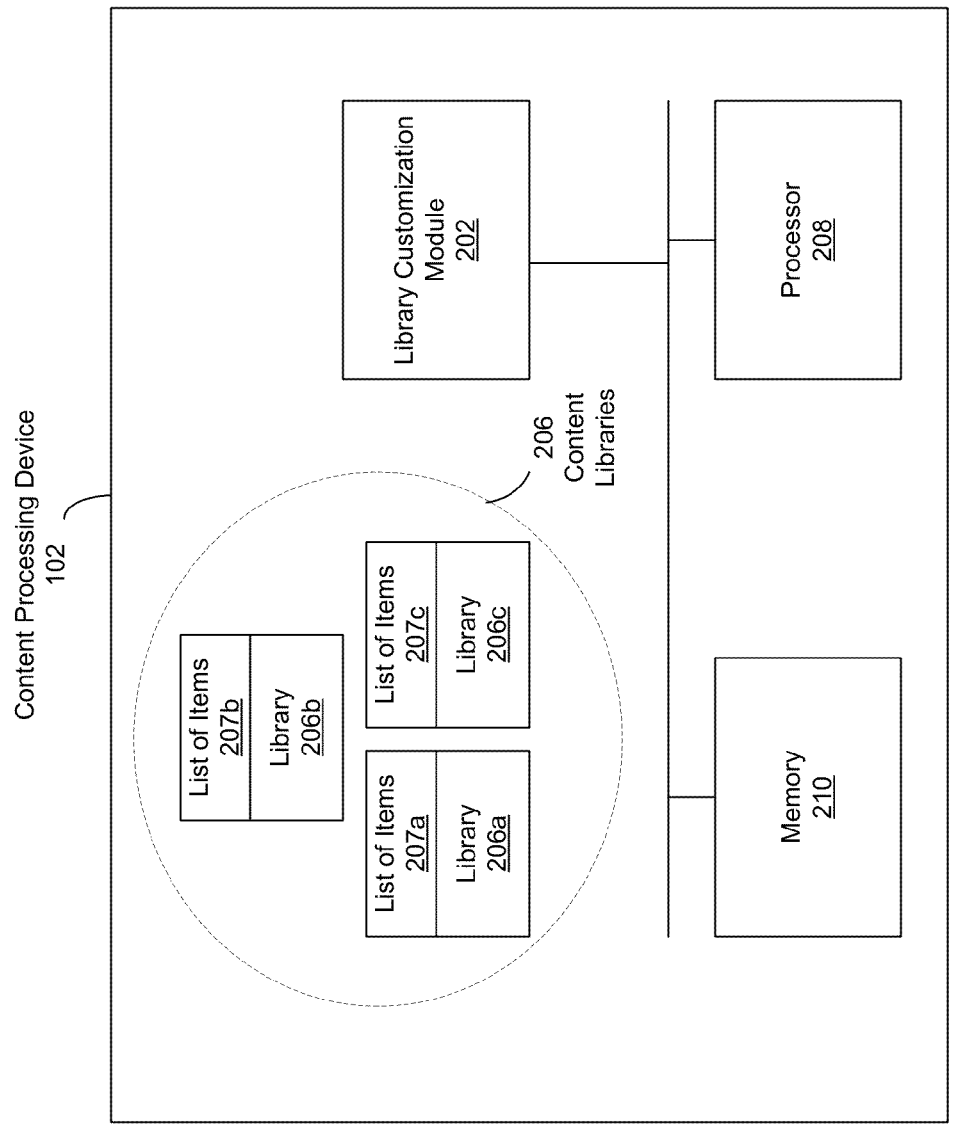
FIG. 2 is a block diagram illustrating an example content processing device, in accordance with an embodiment of the disclosure.

FIG. 2 is a block diagram illustrating an example content processing device, in accordance with an embodiment of the disclosure. Referring to FIG. 2, there is shown the content processing device 102. The content processing device 102 may comprise, for example, a library customization module 202, a processor 208 and a memory 210. The content processing device 102 may comprise a plurality of content libraries 206, of which content libraries 206a-206c are illustrated. There is also shown, in FIG. 2, a list of items 207a associated with the content library 206a, a list of items 207b associated with the content library 206b and a list of items 207c associated with the content library 206c. The content processing device 102 may be as described with respect to FIG. 1, for example.

The library customization module 202 may comprise suitable logic, circuitry, interfaces and/or code that may be operable to perform functions of customizing content consumption interfaces for the content processing device 102. In an example embodiment of the disclosure, the library customization module 202 may be operable to generate customized lists of items such as the list of items 207a-207b for the corresponding content libraries 206a-206c.

The processor 208 may comprise suitable logic, circuitry, interfaces and/or code that may be operable to manage and/or control operations of various components and/or modules such as, for example, the library customization module 202 in the content processing device 102. The processor 208 may utilize an operating system (OS) that enables the execution of various applications.

The memory 210 may comprise suitable logic, circuitry, interfaces and/or code that may be operable to store information such as executable instructions and/or data that may be utilized by the processor 208, the library customization module 202 and/or other modules or components in the content processing device 102. The memory 210 may comprise RAM, ROM, low latency nonvolatile memory such as flash memory and/or other suitable electronic data storage.

In operation, the library customization module 202 in the content processing device 102 may be operable to analyze activity information associated with particular content identified in a content library such as the content library 206a which is associated with a user account. One or more entities associated with the particular content may be identified by the library customization module 202. The library customization module 202 may be operable to collect, from various sources, information related to each of the identified one or more entities. The library customization module 202 may be operable to determine, based on one or both of a result of the analysis of the activity information and the collected information related to each of the identified one or more entities, update information for the particular content. The library customization module 202 may then be operable to add, based on one or more ranking factors, item information comprising the particular content along with the determined update information to a list of items such as the list of items 207a associated with the user account. In this regard, the list of items 207a may be generated and customized by the library customization module 202 for the content library 206a associated with the user account.

The processor 208 in the content processing device 102 may be operable to receive an indication for accessing the content library 206a associated with the user account from a data processing device such as the data processing device 110a. The processor 208 may then be operable to communicate, based on the indication, the customized list of items 207a to the data processing device 110a as a content consumption interface for the user account.

Figure 3:
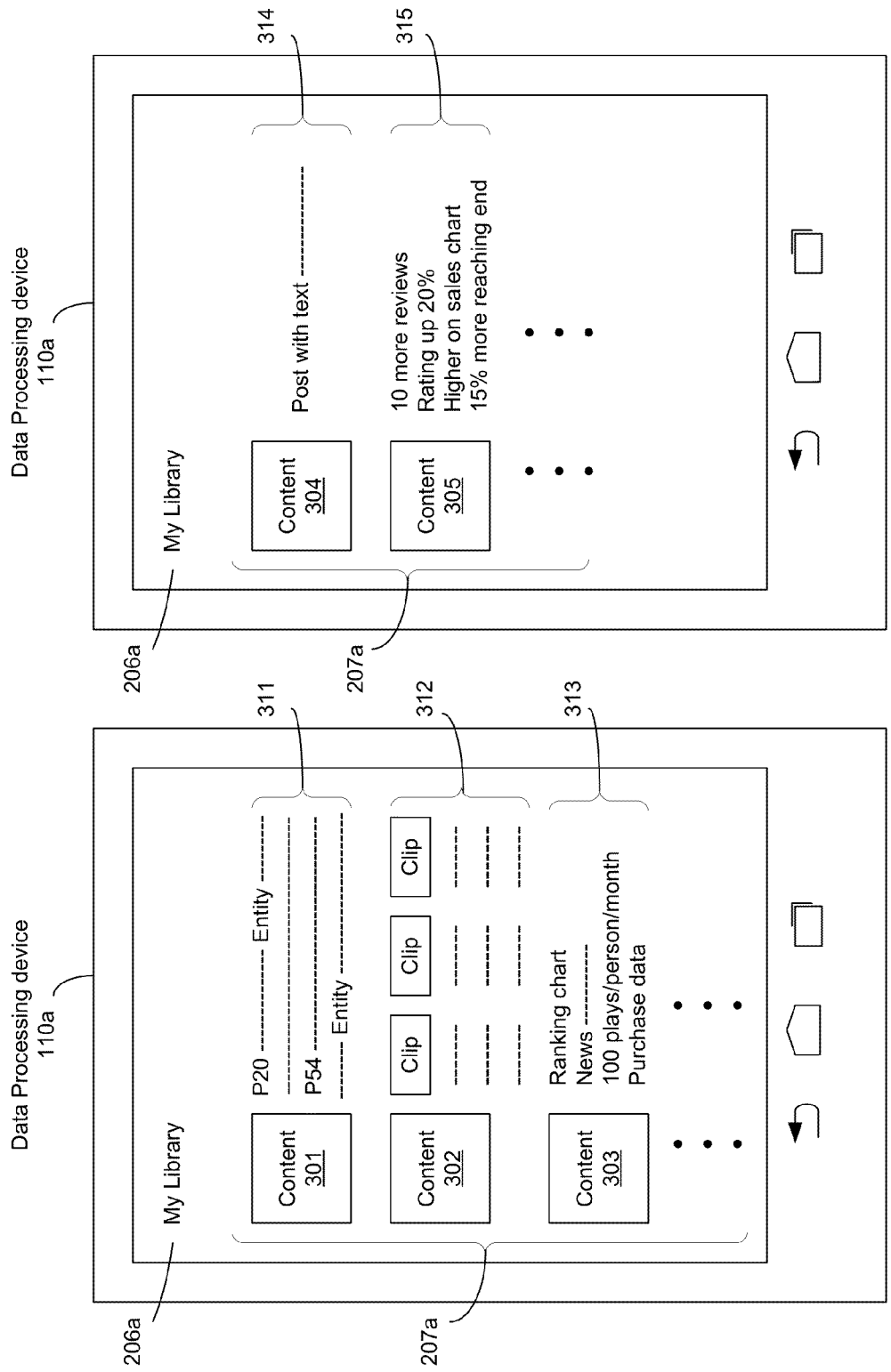
FIG. 3 is a block diagram illustrating an example data processing device displaying a list of items, in accordance with an embodiment of the disclosure.

FIG. 3 is a block diagram illustrating an example data processing device displaying a list of items, in accordance with an embodiment of the disclosure. Referring to FIG. 3, there is shown the data processing device 110a. The data processing device 110a may be as described with respect to FIG. 1, for example. Scenarios described in FIG. 3 are provided by way of example illustration and not of limitation.

In an example operation, the data processing device 110a, which may be associated with the user account, may be operable to communicate an indication for accessing the content library 206a to the content processing device 102. For example, a user may login to the user account via the data processing device 110a for interacting with the content library 206a. The data processing device 110a may then receive the list of items 207a associated with the content library 206a. The list of items 207a may comprise, for example, item information comprising content 301-305 along with corresponding update information 311-315.

In an example embodiment of the disclosure, the update information 311 may comprise, for example, information on one or more particular pages in text content such as the content 301, where the one or more particular pages may mention one or more identified entities. In an example scenario, a famous inventor who is being honored for the anniversary of a breakthrough may be identified in recent news and it is noted that certain pages on the text content 301 (e.g., a book) the user hasn't read mentioned that inventor. In such instances, the identified entity associated with the text content 301 (the book) may be the name of the inventor. The news story about the inventor may be, for example, so important based on a number of published articles that even though the user hasn't interacted with the inventor to show an interest, the item information for the text content 301 may still be ranked as the top or near the top on the list of the items 207a.

The update information 312 may comprise, for example, information on one or more popular video clips and corresponding commentaries, where the one or more popular video clips may be related to the one or more entities associated with video content such as the content 302. In an example scenario, an identified entity may be the video content 302 (e.g., a movie) itself. The user may have stored the video content 302 (the movie) in the content library 206a yet hasn't watched it. An example video clip may be a video clip of an actor in the video content 302 (the movie) describing what it was like to make the video content 302 (the movie). The example video clip may show a 10-second clip of the actual video content 302 (the movie) in the video clip. The video clip of the actor may have been published yesterday and got 1000 views. In such instances, the video clip of the actor along with its commentary may be selected to be included in the update information 312 as, for example, it is new and interesting with relative high conversion rate, and it may inspire the user to actually watch and/or re-watch the video content 302 (the movie).

The update information 313 may comprise, for example, information on song ranking chart, music related news, playback and/or purchasing associated with audio content such as the content 303. In an example scenario, the user may have stored the audio content 302 (e.g., a song) in the content library 206a yet hasn't listened to it. An identified entity may be the title of the audio content 303 (the song). In such instances, for example, song ranking charts, music related news, playback statistics data (e.g., 100 plays/person/month) and purchasing statistics data associated with the audio content 303 (the song) may be selected to be included in the update information 313. The selected update information 313 may, for example, inspire the user to actually listen and/or re-listen to the audio content 303 (the song).

The update information 314 may comprise, for example, information on one or more posts with text related to the one or more entities associated with particular content such as the content 304. In an example scenario, the user may be socially networked or connected to a friend via, for example, a social network. Based on a result of an analysis of activity information associated with the particular content 304, the user may have not interacted with the particular content 304 available in the content library 206a and the friend may have interacted with the particular content 304 available in the friend's content library, for example. The friend may have shared a post with text in a manner to inspire someone to interact with (e.g., view, read, or listen to) the particular content 304. In such instances, the shared post may be selected to be included in the update information 314 for the particular content 304.

The update information 315 may comprise, for example, information on a total number of reviews, a percentage of people who have consumed full content and/or sales charts associated with particular content such as the content 305. In an example scenario, the selected update information 315 may comprise interesting data such as, for example, 10 more reviews received, rating up by 20%, higher on sales chart and/or 15% more people reaching the end of the content, etc.

Figure 4:
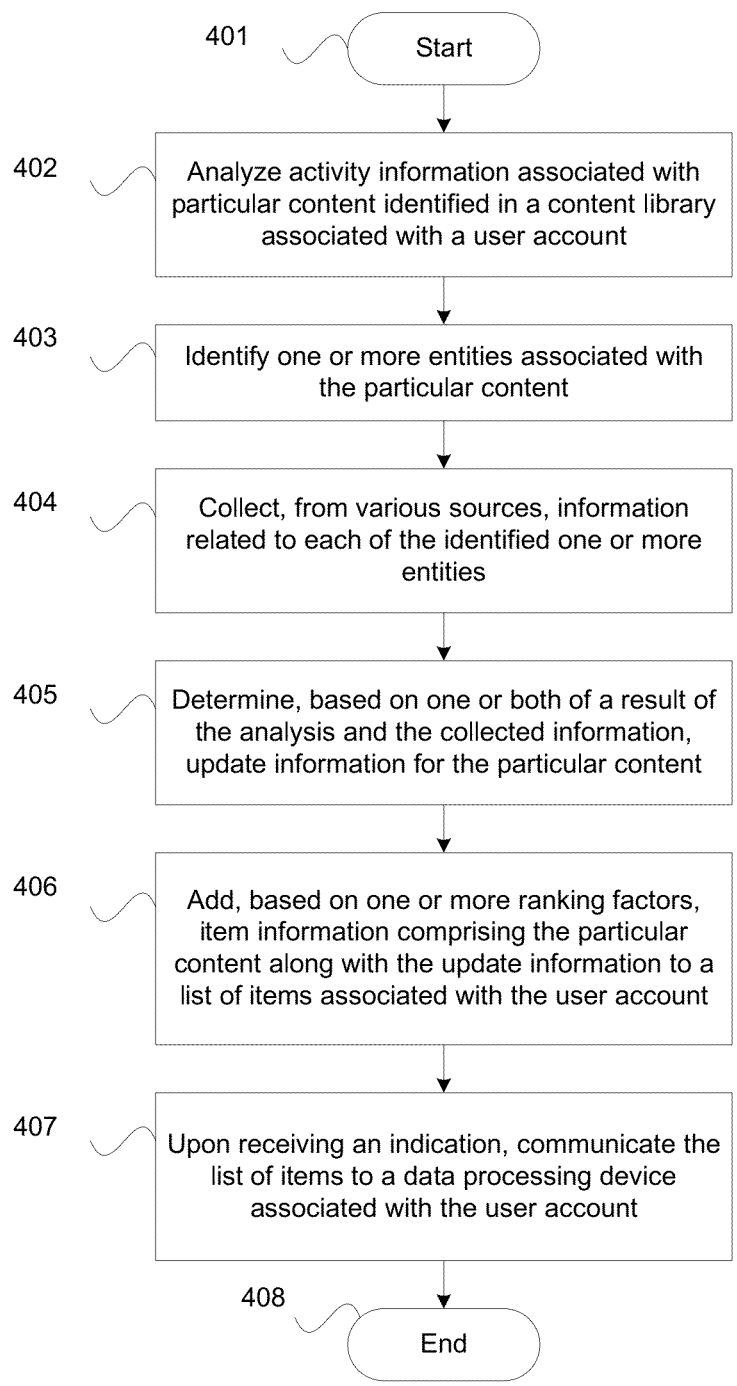
FIG. 4 is a flow chart illustrating example steps for customized content consumption interface, in accordance with an embodiment of the disclosure.

FIG. 4 is a flow chart illustrating example steps for customized content consumption interface, in accordance with an embodiment of the disclosure. Referring to FIG. 4, the example steps start at step 401. In step 402, the library customization module 202 in the content processing device 102 may be operable to analyze activity information associated with particular content such as the content 301 identified in a content library such as the content library 206a which is associated with a user account. In step 403, one or more entities associated with the particular content 301 may be identified by the library customization module 202. In step 404, the library customization module 202 may be operable to collect, from various sources, information related to each of the identified one or more entities. In step 405, the library customization module 202 may be operable to determine, based on one or both of a result of the analysis of the activity information and the collected information related to each of the identified one or more entities, update information such as the update information 311 for the particular content 301. In step 406, the library customization module 202 may then be operable to add, based on one or more ranking factors, item information comprising the particular content 301 along with the determined update information 311 to a list of items such as the list of items 207a associated with the user account. In step 407, upon receiving an indication from a data processing device such as the data processing device 110a associated with the user account, the processor 208 in the content processing device 102 may then be operable to communicate the customized list of items 207a to the data processing device 110a as a content consumption interface for the user account. The example steps may proceed to the end step 408.

In various embodiments of the disclosure, a library customization module 202 in a content processing device 102 may be operable to analyze activity information associated with particular content such as the content 301 identified in a content library 206a which is associated with a user account. One or more entities associated with the particular content 301 may be identified by the library customization module 202. The library customization module 202 may be operable to collect, from various sources, information related to each of the identified one or more entities. The library customization module 202 may be operable to determine, based on one or both of a result of the analysis of the activity information and the collected information related to each of the identified one or more entities, update information such as the update information 311 for the particular content 301. The library customization module 202 may then be operable to add, based on one or more ranking factors, item information comprising the particular content 301 along with the determined update information 311 to a list of items such as the list of items 207a associated with the user account. An indication for accessing the content library 206a associated with the user account may be received, by a processor 208 in the content processing device 102, from a data processing device such as the data processing device 110a. The processor 208 may then be operable to communicate, based on the indication, the list of items 207a to the data processing device 110a. In this regard, the activity information may comprise, for example, action taken by a user of the user account and/or by someone who is socially networked to the user. The particular content may comprise, for example, text content such as the content 301, video content such as the content 302 and/or audio content such as the content 303. The one or more ranking factors may comprise, for example, time of occurrence, entity identification, entity frequency, entity match, interest level, clustered interests and/or library activity.

The update information such as the update information 311 may comprise, for example, information on one or more particular pages in the text content 301, where the one or more particular pages may mention the one or more entities. The update information such as the update information 312 may comprise, for example, information on one or more popular video clips and corresponding commentaries, where the one or more popular video clips may be related to the one or more entities associated with the video content 302. The update information such as the update information 313 may comprise, for example, information on ranking charts, related news, playback and/or purchasing associated with the audio content 303. In some instances, the update information such as the update information 314 may also comprise, for example, information on one or more posts with text related to the one or more entities associated with the particular content such as the content 304. In other instances, the update information such as the update information 315 may also comprise, for example, information on a total number of reviews, a percentage of people who have consumed full content and/or sales charts associated with the particular content such as the content 305.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for customized content consumption interface.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a content library server:
analyzing activity information associated with particular content identified in a content library which is associated with a user account, wherein the activity information comprises an indication of an absence of interaction by a user of the user account with a portion of the particular content;
identifying one or more entities associated with the portion of the particular content;
collecting, from various sources, information related to each of the identified one or more entities;
determining, based on one or both of a result of the analysis of the activity information and the collected information related to each of the identified one or more entities, update information for the particular content; and
adding, based on one or more ranking factors, item information comprising the particular content along with the determined update information to a list of items associated with the user account.

2. The method according to claim 1, comprising:
receiving, from a data processing device, an indication for accessing the content library associated with the user account; and
communicating, based on the indication, the list of items to the data processing device.

3. The method according to claim 1, wherein the activity information comprises action taken by a user of the user account and/or by someone who is socially networked to the user.

4. The method according to claim 1, wherein the particular content comprises text content, video content and/or audio content.

5. The method according to claim 4, wherein the update information comprises information on one or more particular pages in the text content, where the one or more particular pages mention the one or more entities.

6. The method according to claim 4, wherein the update information comprises information on one or more popular video clips and corresponding commentaries, where the one or more popular video clips are related to the one or more entities associated with the video content.

7. The method according to claim 4, wherein the update information comprises information on ranking charts, related news, playback and/or purchasing associated with the audio content.

8. The method according to claim 1, wherein the update information comprises information on one or more posts with text related to the one or more entities associated with the particular content.

9. The method according to claim 1, wherein the update information comprises information on a total number of reviews, a percentage of people who have consumed full content and/or sales charts associated with the particular content.

10. The method according to claim 1, wherein the one or more ranking factors comprise time of occurrence, entity identification, entity frequency, entity match, interest level, clustered interests and/or library activity.

11. A system, comprising:
a content library server, wherein the content library server is operable to:
analyze activity information associated with particular content identified in a content library which is associated with a user account, wherein the activity information comprises an indication of an absence of interaction by a user of the user account with a portion of the particular content;
identify one or more entities associated with the portion of the particular content;
collect, from various sources, information related to each of the identified one or more entities;
determine, based on a result of the analysis of the activity information and the collected information related to each of the identified one or more entities, update information for the particular content; and
add, based on one or more ranking factors, item information comprising the particular content along with the determined update information to a list of items associated with the user account.

12. The system according to claim 11, wherein the content library server is operable to:
receive, from a data processing device, an indication for accessing the content library associated with the user account; and
communicate, based on the indication, the list of items to the data processing device.

13. The system according to claim 11, wherein the activity information comprises action taken by a user of the user account and/or by someone who is socially networked to the user.

14. The system according to claim 11, wherein the particular content comprises text content, video content and/or audio content.

15. The system according to claim 14, wherein the update information comprises information on one or more particular pages in the text content, where the one or more particular pages mention the one or more entities.

16. The system according to claim 14, wherein the update information comprises information on one or more popular video clips and corresponding commentaries, where the one or more popular video clips are related to the one or more entities associated with the video content.

17. The system according to claim 14, wherein the update information comprises information on ranking charts, related news, playback and/or purchasing associated with the audio content.

18. The system according to claim 11, wherein the update information comprises information on one or more posts with text related to the one or more entities associated with the particular content.

19. The system according to claim 11, wherein the update information comprises information on a total number of reviews, a percentage of people who have consumed full content and/or sales charts associated with the particular content.

20. A method, comprising:

in a content library server:

analyzing activity information associated with particular content identified in a content library which is associated with a user account, wherein the activity information comprises an indication of an absence of interaction by a user of the user account with a portion of the particular content;

identifying one or more entities associated with the portion of the particular content;

collecting, from various sources, information related to each of the identified one or more entities;

determining, based on one or both of a result of the analysis of the activity information and the collected information related to each of the identified one or more entities, update information for the particular content;

adding, based on one or more ranking factors, item information comprising the particular content along with the determined update information to a list of items associated with the user account;

receiving, from a data processing device, an indication for accessing the content library associated with the user account; and communicating, based on the indication, the list of items to the data processing device.

* * * * *